US010570771B2

(12) United States Patent
Kollenrott et al.

(10) Patent No.: US 10,570,771 B2
(45) Date of Patent: Feb. 25, 2020

(54) DAMPING MEANS FOR COMPONENTS IN A TURBOMACHINE AND METHOD FOR ASSEMBLING SAID DAMPING MEANS

(71) Applicant: ANSALDO ENERGIA IP UK LIMITED, London (GB)

(72) Inventors: Martin Kollenrott, Stuttgart (DE); Ivo Belina, Rieden (CH); Armando Alsina, Zürich (CH); Jeffrey De Jonge, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 622 days.

(21) Appl. No.: 15/182,736

(22) Filed: Jun. 15, 2016

(65) Prior Publication Data
US 2016/0363002 A1 Dec. 15, 2016

(30) Foreign Application Priority Data

Jun. 15, 2015 (EP) .................................... 15172015

(51) Int. Cl.
*F01D 25/04* (2006.01)

(52) U.S. Cl.
CPC ................... *F01D 25/04* (2013.01)

(58) Field of Classification Search
CPC .......... F01D 25/04; F01D 25/28; F02C 7/222; F16F 1/362; F16L 3/1091; F16L 55/035; F23R 3/283; F23R 3/60
USPC ........................................................ 181/207
See application file for complete search history.

(56) References Cited

U.S. PATENT DOCUMENTS

| 3,395,775 A | * | 8/1968 | Smith ..................... F01D 25/04 |
| | | | 181/207 |
| 3,778,184 A | * | 12/1973 | Wood ..................... F01D 9/042 |
| | | | 415/119 |
| 4,747,624 A | | 5/1988 | Faber et al. |
| 4,860,852 A | * | 8/1989 | Valev .................. F01N 13/1811 |
| | | | 181/240 |
| 5,683,119 A | | 11/1997 | Emmons et al. |

(Continued)

FOREIGN PATENT DOCUMENTS

EP 0 989 289 A1 3/2000

OTHER PUBLICATIONS

European Search Report dated Dec. 17, 2015 for Application No. 15172015.8.

*Primary Examiner* — Jeremy A Luks
(74) *Attorney, Agent, or Firm* — Armstrong Teasdale LLP

(57) ABSTRACT

The present disclosure relates to a damping device for absorbing structural vibrations or high excitation frequencies between a first component and a second component of a turbomachine, particularly in connection with high temperature operating conditions. The first component may be a combustor or a burner of a gas turbine and the second component may be a fuel supply line, connected to or passed through a wall of the first component. The damping device may include at least one wire mesh element which is inserted into a housing with a radially outer surface of the wire mesh element being compressed by the housing, and a radially inner surface of the wire mesh element closely surrounding the second component, wherein the housing is fixedly connected to the wall of the first component by a weld seam.

18 Claims, 3 Drawing Sheets

(56) References Cited

U.S. PATENT DOCUMENTS

| | | | | |
|---|---|---|---|---|
| 6,151,898 A * | 11/2000 | Hogan | ............... | F23D 11/46 |
| | | | | 60/740 |
| 7,026,736 B2 * | 4/2006 | Safonov | ............. | F01D 25/04 |
| | | | | 310/51 |
| 7,250,699 B2 * | 7/2007 | Safonov | ............. | F01D 25/04 |
| | | | | 290/55 |
| 8,109,362 B2 * | 2/2012 | Agrawal | ........... | F23M 20/005 |
| | | | | 123/256 |
| 8,851,423 B1 * | 10/2014 | Lewis | ............... | B64C 1/1484 |
| | | | | 181/207 |
| 9,657,591 B2 * | 5/2017 | Schleif | ............... | F01D 25/04 |
| 9,689,422 B2 * | 6/2017 | Yoshino | ............. | F01D 25/22 |
| 9,695,713 B2 * | 7/2017 | Eshak | ............... | F01D 25/164 |
| 10,107,378 B2 * | 10/2018 | Miller | ............... | F02C 7/36 |
| 2009/0304313 A1 | 12/2009 | Ertas | | |
| 2014/0321779 A1 | 10/2014 | Park et al. | | |
| 2014/0338343 A1 * | 11/2014 | Ouellet | ............. | F23R 3/286 |
| | | | | 60/740 |
| 2017/0009655 A1 * | 1/2017 | Savela | ............... | F01D 25/164 |
| 2017/0335865 A1 * | 11/2017 | Steen | ............... | F01D 5/12 |
| 2018/0058404 A1 * | 3/2018 | Tibbs | ............... | F02C 7/222 |

\* cited by examiner

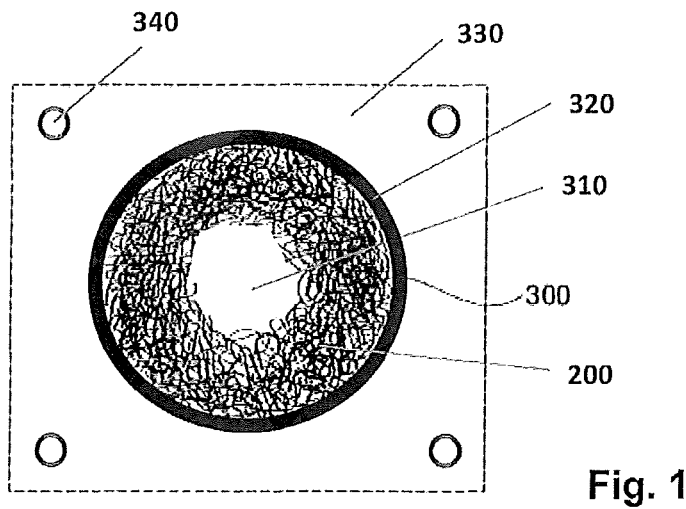
Fig. 1
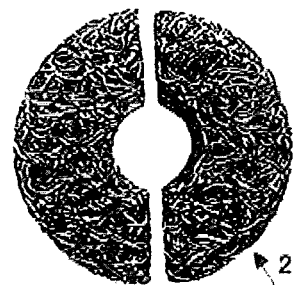
Fig. 2
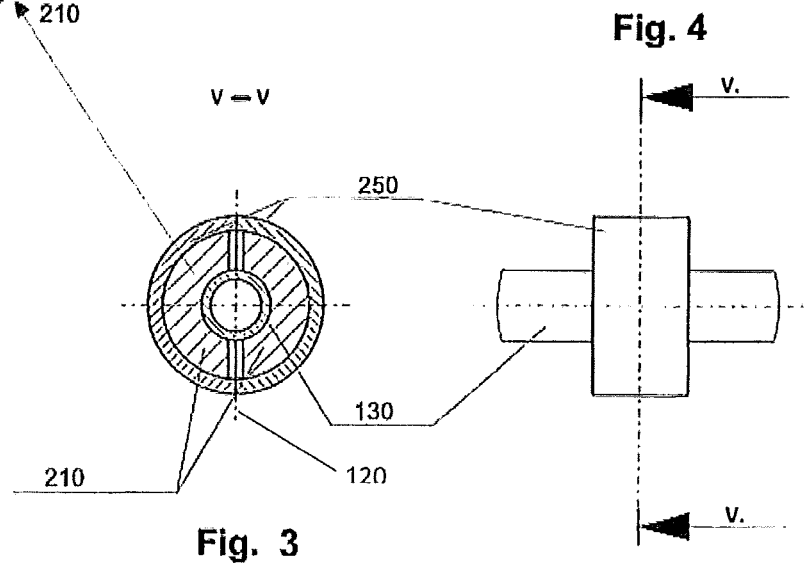
Fig. 3
Fig. 4

DAMPING MEANS FOR COMPONENTS IN A TURBOMACHINE AND METHOD FOR ASSEMBLING SAID DAMPING MEANS

TECHNICAL FIELD

The present invention relates to the technology of turbomachines. It refers to damping means for absorbing structural vibrations or high excitation frequencies between a first component and a second component of the turbomachine. According to a preferred embodiment of the present invention the first component is a combustor or a burner of a gas turbine and the second component is a pipe, e.g. a fuel supply line, connected to or passed through a wall of said first component. In addition, the invention relates to a method for assembling said damping means.

BACKGROUND OF THE INVENTION

Turbomachines, such as steam turbines, gas turbines, compressors, pass through several transient operating modes before operating under nominal conditions. During all operating modes, including nominal operating conditions, critical structural vibrations may occur.

These structural vibrations may cause damages or reduce the lifetime of certain machine components, if not adequately dampened.

For the purpose of protecting sensitive components against disruptive structural vibrations it is generally known in the field of machine engineering to apply wire mesh elements for insulating or damping such disruptive vibrations. In addition, wire mesh elements provide a certain shock resistance and a thermal resistance up to more than 1000° C.

Wire meshes are made from continuous or quasi-continuous wire in the form of intermeshing stitches. The extremely small contact surfaces at the contact points in combination with captured air in the cavities ensure low heat transfer rates. The meshwork is three-dimensionally flexible and provides good elasticity and stretching characteristics.

FIG. 1 shows a typical structure of a vibration insulating and damping element 300. Core piece of such an insulating and damping element 300 is a wire mesh element (cushion) 200. FIG. 1 illustrates a one-piece wire mesh element 200.

Such types of insulating and damping elements 300 are broadly used for vibrations insulating or damping bearings of machines, e.g. as a base for pedestals of vibrating machines. Regularly, these insulating/damping elements 300 consist of round or rectangular (not shown) cushions 200 made of woven compressed stainless steel wire, inserted into a complementary shaped housing 320. The cushion 200 may be equipped with a central bore 310 for the machine pedestal or a screw or bolt to mount the machine on the bottom. A base plate 330 with screw holes 340 for screwing the damping element on a base may exist. The housing 320 is connected either with the base plate 330 or with the machine pedestal.

Document US 2009/0304313 A1 describes a compliant hybrid gas journal bearing, including compliant hybrid bearing pads having a hydrostatic recess and a capillary restrictor for providing a flow of pressurized gas to the bearing. The bearing also includes an inner rim adjacent the bearing pads, an outer rim and a damper bridge between the inner and outer rims. The damper bridge has an axial length that is less than an axial length of the bearing pads and the outer rim to form a damper cavity on each side of the damper bridge. An integral wire mesh damper is situated within the damper cavity on each side of the damper bridge. Integral centering springs are located between the inner and outer rims to provide radial and rotational compliance to the bearing pads. The oil-free bearing design addresses the low damping and low load capacity characteristics that are inherent in present day compliant air foil bearing designs, while retaining the compliance to changes in rotor geometry.

EP 0 989 289 A1 describes a vibration-decoupling joint of the type in which two annular end pieces, sealingly fixable to respective opposite portions of a pipe to be connected, are connected to each other by a first metal bellows-shaped sleeve, elastically deformable and which connects the end pieces with a fluid-tight seal, and by a second metal sleeve defining a part that mechanically supports the connection, located radially outside of the bellows sleeve and the end pieces, fitted axially over these latter; a first end piece has an internal flow-guide element shaped to define a cantilevered portion of duct that extends axially with radial play into the first metal sleeve and towards the second end piece, starting from the first end piece and extending in the direction of flow until it reaches the second end piece; the flow guide element is formed from an annular plug in the form of a pipe formed from wire mesh, constituted by a tubular metal sock folded to form multiple radial layers and made from stainless steel wire braided to form a linked mesh.

The cited state of the art does not disclose or suggest the use of wire mesh elements as damping means in connection with a turbomachine, especially in connection with a thermally loaded component of a gas turbine.

SUMMARY OF THE INVENTION

It is an object of the present invention to open up a new field of use of said wire mesh elements, namely for absorbing structural vibrations or high excitation frequencies between a first component and a second component of a turbomachine, particularly in connection with high temperature operating conditions, e.g. in connection with a combustor or a burner of a gas turbine.

This object is obtained by a damping means according to claim 1 and a method for assembling a damping means according to claim 14.

The damping means according to the invention for absorbing structural vibrations or high excitation frequencies between a first component of a turbomachine, for example a combustor or a burner of a gas turbine, and a second component of this turbomachine, whereby this second component, for example a pipe, particularly a pipe of a fuel supply line, is connected to or passed through a wall of said first component. This damping means is characterized in that it comprises at least one wire mesh element.

According to a preferred embodiment the wire mesh element is designed as a multi-part element.

Specifically, the wire mesh element consists of two half shells.

According to another preferred embodiment the wire mesh element is inserted into a housing with a radially outer surface of the wire mesh element being compressed by the housing, and a radially inner surface of the wire mesh element closely surrounding the second component, wherein said housing is fixedly connected to the first component.

According to a further important embodiment the housing is assembled from at least two halves, being detachably interconnected.

Most preferably the housing is assembled from two halves, interconnected by detachable fasteners, such as screws.

Mostly preferably, the wire mesh element consists of two half shells and the housing is assembled from two halves, wherein the wire mesh half shells and the housing halves have identical parting planes in assembled condition.

According to another embodiment the housing is connected to the first component by a welded joint or a brazed joint.

In another embodiment the housing is equipped with a sliding sleeve, surrounding the wire mesh element. The sliding sleeve permits a certain axial movement of the wire mesh element within the housing to compensate manufacturing tolerances or deformations during operation.

The method for assembling a damping means according to the invention is characterized by the following steps:
(1) inserting a first half-shell of the wire mesh element into a first half of the housing,
(2) inserting a second half-shell of the wire mesh element into a second half of the housing,
(3) positioning the first half and the second half of the housing around said second component,
(4) interconnecting the first half and the second half of the housing by at least one detachable fastener,
(5) moving the assembled housing to the wall of said first component of the turbomachine,
(6) compressing the wire mesh halves between the housing and the second component by further tightening the at least one detachable fastener,
(7) welding or brazing the housing to the wall of the first component.

BRIEF DESCRIPTION OF THE DRAWINGS

Additional features and advantages of the present invention are now to be explained in more detail with reference to the accompanying drawings.

FIG. 1 shows a typical structure of a vibration damper with a wire mesh element according to the state of the art;

FIG. 2 shows an embodiment of a wire mesh element, consisting of two half shell parts;

FIG. 3 shows a cross-sectional view of the damping means according to FIG. 4;

FIG. 4 shows a principal sketch of a damping means according to the invention;

DETAILED DESCRIPTION OF EXEMPLARY EMBODIMENTS

Figure 5:
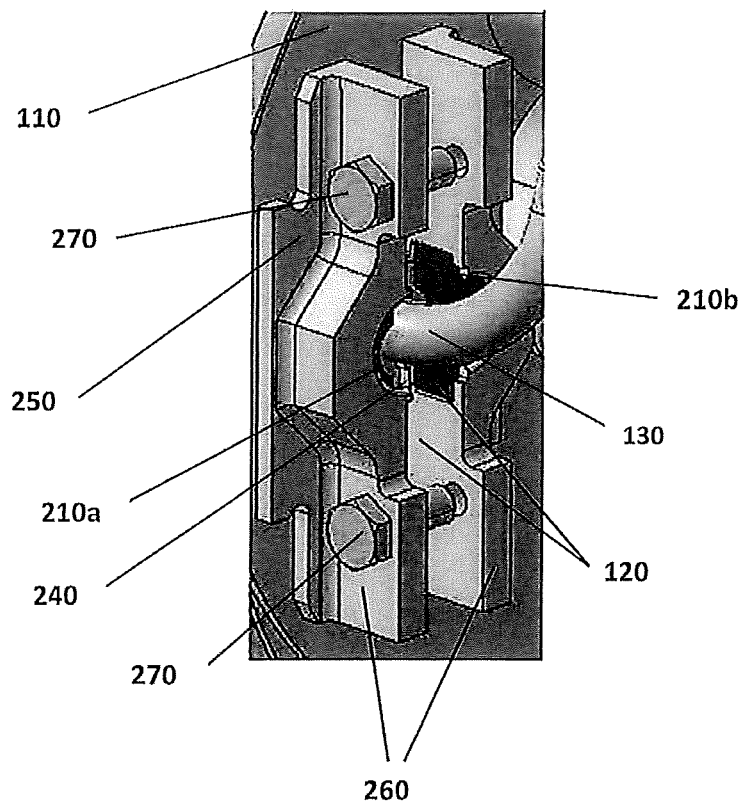
FIG. 5 shows in a perspective view a damping means according to the invention during a semifinished step of assembling

FIGS. 2 to 4 illustrate in a very schematic manner a principal sketch of the basic features of the damping means according to the invention. A pipe 130 passing through a wall of a first component of a turbomachine, e.g. a combustor or a burner of a gas turbine, is protected from structural vibrations of this component. For this purpose the pipe 130 is surrounded by a damping element 200, 210. For easily assembling and disassembling the damping element 200 is designed as a two-piece element 210, consisting of two identical wire mesh half shells 210a, 210b. The inner surfaces of these wire mesh half shells 210, 210a, 210b are adapted to the outer contour of the pipe 130. Pipe 130 and wire mesh half shells 210, 210a, 210b are surrounded by a housing 250. The housing 250 presses the two wire mesh half shells 210, 210a, 210b against the pipe 130, forming a friction and form fit connection between the pipe 130 and the housing 250. For the purpose of easily assembling and disassembling of the damping element the housing 250 also consists of two halves 260, analogous to the wire mesh element 200, 210. Thereby it is advantageous to arrange the housing halves 260 and the wire mesh half shells 210, 210a, 210b in such a way that they form a common parting plane 120. Preferably the parting plane 120 coincides with the symmetry axis of the assembled housing 250. In this case identically designed housing halves 260 and identically shaped and dimensioned wire mesh half shells 210, 210a, 210b can be used. By bolting together the two housing halves 260 (see FIG. 5 and FIG. 6), the necessary contact pressure of the wire mesh elements 210 to the pipe 130 is applied. Each of the halves 260 of the housing 250 has an inner surface, adapted to the outer contour of the wire mesh half shells 210 for insertion of said half shells 210 into the housing halves 260. As mentioned before, the half shells 210 are inserted in such a way that all parts form the same parting plane 120. Under operating conditions the housing 250 is fixedly connected to the wall 110 of said first component (100) with the structural vibrations.

FIG. 5 illustrates the damping means according to the invention in a semifinished assembling step. The pipe 130, e.g. for supplying fuel to the combustor or burner of the gas turbine, passes through a wall 110 of said combustor or burner without a direct contact to this wall 110. For this purpose, the wall 110 is equipped with a respective through hole (not shown) and the pipe 130 is held in its position by the surrounding wire mesh element 200. The wire mesh element 200, in turn, is inserted into the housing 250. The housing 250, consisting of two halves 260, provides a central through hole for passing through the pipe 130. Simultaneously this through hole is dimensioned for the insertion of the wire mesh damping element 200. For easily assembling both, the housing 250 and the wire mesh element 200 are designed as multipart components, especially as two-piece parts 260, 210. Each housing half 260 provides a semicircular cavity for inserting the half shells 210a, 210b of the wire mesh element 200. The two housing halves 260 are positioned around the pipe 130 and are connected by screws 270 to form a loose joint between the housing halves 260 and for holding them in their position around the pipe 130. In the following step the assembled housing 250 is moved to the wall 110 of said first component and the screws 270 are tightened. By tightening the screws 270 the wire mesh halves 210, 210a, 210b are pressed onto the pipe 130 and form a friction and form fit connection between the pipe 130 and the housing 250.

Finally, the housing 250 is connected to the wall 110 by welding.

Figure 6:
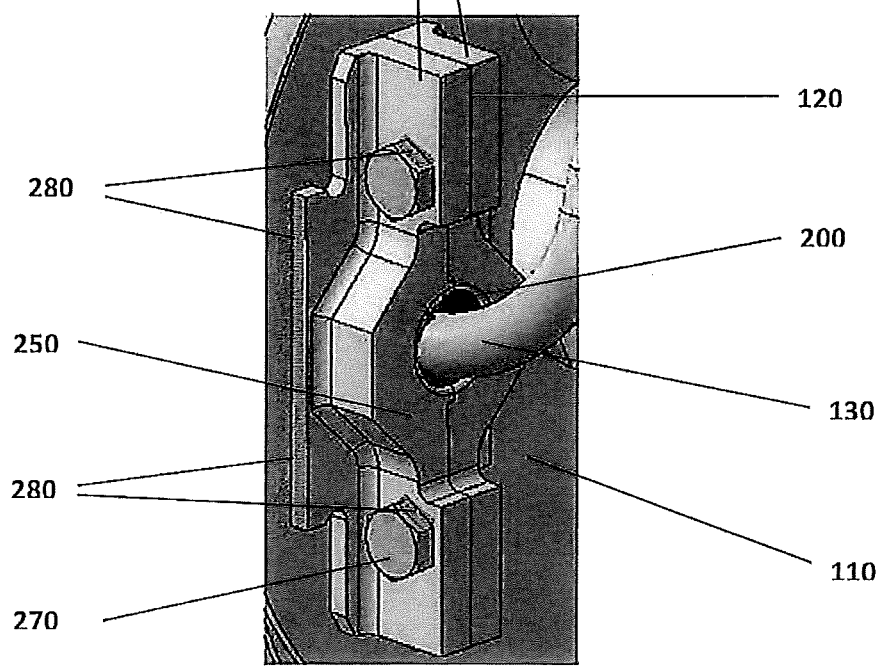
FIG. 6 shows in a perspective view a damping means according to the invention in its final state

FIG. 6 illustrates this final state. The housing 250 is fixedly connected to the wall 110 of the first component 100 by a weld seam 280. If considered necessary, an additional weld seam 280 may be applied to the connecting screws 270 as a screw locking means. The wire mesh element 200 surrounds concentrically or quasi-concentrically the pipe 130. Due to the vibrations damping and insulating properties of the wire mesh element 200 and its thermal resistance a vibration-absorbing conjunction between the wall 110 and the pipe 130 is effected, even in the high temperature environment of gas turbine combustors or burners.

The housing 250 fulfills at least the following functions. It forms a containment for the wire mesh element 200, protecting it against external hazard during operation, maintaining its integrity and form stability and ensuring a fixed and permanent connection to the wall 110 of said combustor or burner etc.

In addition, the housing 250 applies pressure against the wire mesh element 200 to effect a frictional and form fit connection between the wire mesh element 200 and the pipe 130, as mentioned above.

Figures 7A, 7B, 7C:
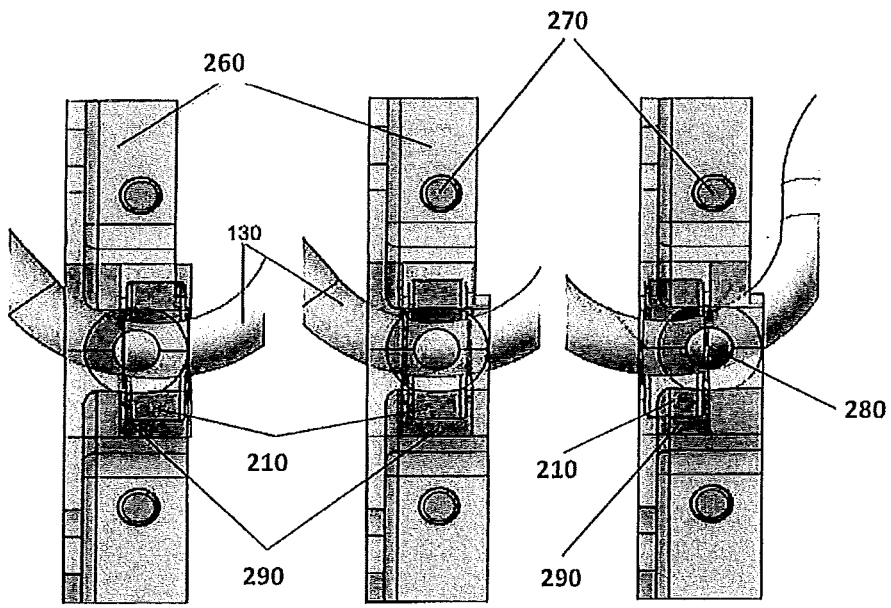
FIG. 7a-c show variable positions of the wire mesh element with using a sliding sleeve.
Figure 8:
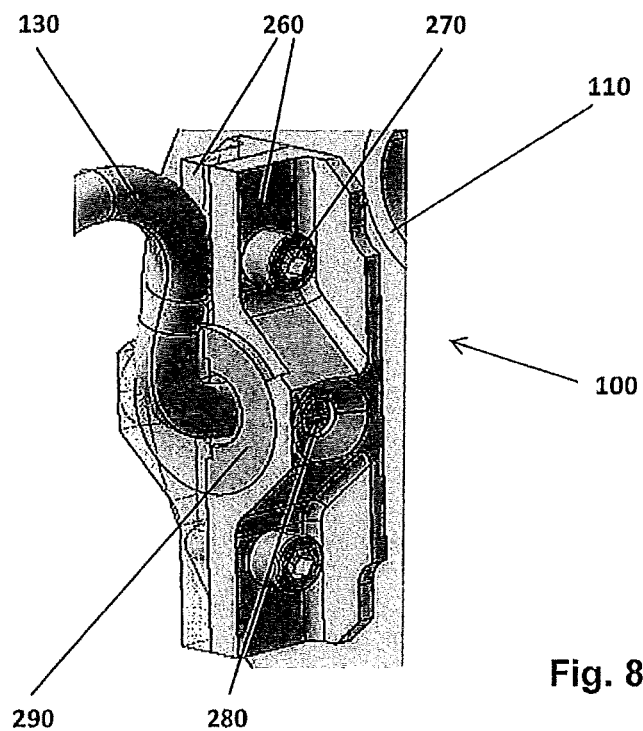
FIG. 8 shows the embodiment of FIG. 7a-c in a perspective view.

FIGS. 7 a), b), c) and 8 illustrate the principle of a device according to the invention which permits a certain axially variable positioning or a certain axial movement of the wire mesh element 200, 210 within the housing 250 or housing halves 260 to compensate manufacturing tolerances or deformations of the involved components during installation or operation. This additional variability may be achieved by a sliding sleeve 290, integrated into the housing 250, 260 and capable of being shifted in axial direction within the housing 250 or housing halves 260. The sliding sleeve 290 permits a certain axial movement e.g. in a range up to 10 mm, but prevents rotational movement. The FIG. 7 a) to c) show the pipe 130 in different axial positions compared to the housing 250 and consequently, after assembly, in different axial positions in relation to the wall 110 of the combustor or burner. If required under operating conditions, the sliding sleeve 290 may be fixed, e.g. by a weld point 280.

The advantages of the damping means according to the present invention include
high damping rate with low intrinsic part weight;
high corrosion resistance;
high temperature resistance, up to 1000° C.;
short assembly time and disassembly time;
high static and dynamic strain rates.

LIST OF REFERENCE NUMERALS 100 first component, e.g. combustor or burner of a gas turbine
110 wall of the first component
120 parting plane
130 second component, e.g. pipe
200 wire mesh element
210 part of a multi-part wire mesh element
210a, 210b half-shells of a wire mesh element
250 housing
260 housing halves
270 screw
280 weld seam
290 sliding sleeve
300 vibration insulating/damping element
310 central bore
320 housing
330 base plate
340 screw hole

The invention claimed is:

1. Damping means for absorbing structural vibrations or high excitation frequencies between a first component of a turbomachine, for example a gas turbine, and a second component of the turbomachine, which second component is connected to or passed through a wall of the first component, wherein the damping means comprises:
at least one wire mesh element comprising a radially outer surface; and
a housing comprising two halves, each of the two halves comprising a middle portion and two end portions extending oppositely from the middle portion, the middle portion comprising a radially inner surface, the end portions of each of the two halves configured to interconnect with the end portions of the other of the two halves such that the radially inner surface of the two halves cooperate in extending substantially continuously about, and compressing, the radially outer surface of the at least one wire mesh element.

2. Damping means according to claim 1, wherein the wire mesh element is designed as a multi-part element.

3. Damping means according to claim 2, wherein the wire mesh element consists of two half-shells.

4. Damping means according to claim 1, wherein a radially inner surface of the wire mesh element closely surrounds the second component, wherein the housing is fixedly connected to the first component.

5. Damping means according to claim 1, wherein the housing fulfills the function of a containment of the at least one wire mesh element.

6. Damping means according to claim 4, wherein the joint between the wire mesh element and the second component and/or the joint between the wire mesh element and the housing permits an axial and/or radial and/or tilting movement of the second component relative to the first component for the compensation of manufacturing tolerances or deformations of the involved components during installation or operation.

7. Damping means for absorbing structural vibrations or high excitation frequencies between a first component of a turbomachine, for example a gas turbine, and a second component of the turbomachine, which second component is connected to or passed through a wall of the first component, wherein the damping means comprises:
at least one wire mesh element, wherein the wire mesh element is inserted into a housing with a radially outer surface of the wire mesh element being compressed by a radially inner surface of the housing, and a radially inner surface of the wire mesh element closely surrounding the second component, wherein the housing is fixedly connected to the first component, and wherein an axially movable sliding sleeve is inserted into the housing.

8. Damping means according to claim 1, wherein the end portions each comprise a mating face configured to contact the mating face of another of the end portions.

9. Damping means according to claim 8, wherein the the end portions are interconnected by detachable fasteners.

10. Damping means according to claim 1, wherein the housing is connected to the wall of the first component by welding or brazing.

11. Damping means according to claim 1, wherein the wire mesh element is made from metal.

12. Damping means according to claim 11, wherein the wire mesh element is made from steel or a steel alloy or a Cr—Ni-based alloy.

13. Damping means according to claim 1, wherein the first component is a combustor or a burner of a gas turbine and the second component is a pipe of a fuel supply line to the combustor or burner.

14. Method for assembling a damping means, the method comprising:
(1) inserting a first half-shell of a wire mesh element into a first half of a housing,
(2) inserting a second half-shell of the wire mesh element into a second half of the housing, each of the first and second halves of the housing comprising a middle portion and two end portions extending oppositely from the middle portion, the middle portion comprising a radially inner surface, (3) positioning the first half and the second half of the housing around a second component, (4) interconnecting the each end portions of the first half of the housing to one of the end portions of the second half of the housing by at least one detachable fastener, (5) moving the interconnected housing to a wall of a first component of a turbomachine, (6) compressing the wire mesh halves between the housing and the second component by further tightening the at least one detachable fastener, wherein the radially inner surface of the first and second halves of the housing cooperate to extend substantially continuously about, and compress, a radially outer surface of the wire mesh halves, and (7) welding or brazing the housing to the wall of the first component.

15. Method according to claim 14, wherein the detachable fasteners are screws.

16. Method according to claim 15, wherein the screws are secured by a weld seam.

17. Method according to claim 14, wherein the first component is a combustor or a burner of a gas turbine.

18. Method according to claim 14, wherein the second component is a fuel supply line.

\* \* \* \* \*